United States Patent [19]

Mellinger

[11] 4,241,674
[45] Dec. 30, 1980

[54] SUB-SOIL PLANTER

[75] Inventor: Paul B. Mellinger, Willow Street, Pa.

[73] Assignee: Mellinger Manufacturing Co., Inc., Willow Street, Pa.

[21] Appl. No.: 2,652

[22] Filed: Jan. 11, 1979

[51] Int. Cl.³ ............................................. A01C 5/00
[52] U.S. Cl. ......................................... 111/52; 111/59; 111/73; 111/85; 172/156; 172/196; 172/657
[58] Field of Search ...................... 111/85, 1, 7, 52, 53, 111/54, 55, 56, 59, 60, 61, 62, 63, 64, 65, 73, 81, 86, 87, 85, 80; 172/59, 134, 142, 145, 149, 196, 174, 417, 470, 488, 619, 613, 624, 639, 649, 650, 686, 739, 748, 763, 776, 484, 657, 156

[56] References Cited

U.S. PATENT DOCUMENTS

| | | | |
|---|---|---|---|
| 2,674,212 | 4/1954 | Callaham et al. | 172/146 |
| 2,734,439 | 2/1956 | Padrick | 111/85 X |
| 2,782,740 | 2/1957 | Wood | 111/52 |
| 3,042,118 | 7/1962 | Norris | 172/1 |
| 3,122,111 | 2/1964 | Taylor | 111/30 |
| 3,170,421 | 2/1965 | Norris et al. | 111/1 |
| 3,175,522 | 3/1965 | Garber et al. | 111/61 |
| 3,202,222 | 8/1965 | Norris | 172/177 |
| 3,220,370 | 2/1965 | Smith | 111/51 |
| 3,362,361 | 1/1968 | Morrison | 111/73 |
| 3,389,754 | 6/1968 | Allison | 111/85 X |
| 3,398,707 | 8/1968 | McClenny | 111/85 |
| 3,742,877 | 7/1973 | Coffee | 111/85 |
| 3,841,529 | 10/1974 | Hatcher | 222/177 |
| 4,055,126 | 10/1977 | Brown et al. | 111/85 |
| 4,070,974 | 1/1978 | Stacy | 111/85 |
| 4,083,315 | 4/1978 | Crabbs | 111/10 |
| 4,187,916 | 2/1980 | Harden et al. | 172/196 |
| 4,191,262 | 3/1980 | Sylvester | 172/484 |

OTHER PUBLICATIONS

Anon. (Advertisement) "The Subsoiler/Bedder/Planter Profitmaker" from: *Implement and Tractor* p. 6, Jan. 7, 1978.
Anon. (Brochure) "Sub-Soil Planter", by: Mellinger Manufacturing Co., Inc. Willow St. R.D. 2, Pa. 17584.

*Primary Examiner*—Edgar S. Burr
*Assistant Examiner*—James R. Feyrer
*Attorney, Agent, or Firm*—Michael R. Swartz

[57] ABSTRACT

A sub-soil planter machine has a frame, including front and rear transverse tool bars; a plurality of sub-soil blades mounted on and transversely spaced along the front tool bar; a plurality of rotary tilling assemblies mounted on and transversely spaced along the rear tool bar; and a plurality of planter units mounted on and transversely spaced along the rear tool bar in trailing relationship to the rotary tilling assemblies. The sub-soil blades, rotary tilling assemblies and planter units are so arranged in close proximity to one another such that the depth of the machine has been reduced whereby a given sized tractor, to which the machine is mounted on, is capable of lifting a larger machine than heretofore been accomplished due to the closeness of the machine to the rear end of the tractor resulting in a shorter length movement arm.

The rear tool bar is pivotally connected to the front tool bar whereas the rotary tilling assemblies and planter units are pivotally mounted on the rear tool bar whereby, each of the rotary tilling assemblies and planter units are free to float independently of one another and independently of the front tool bar thereby permitting the machine to follow the contour of the ground.

Furthermore, each of the planter units are connected to a respective one of the rotary tilling assemblies such that each combined unit can be moved in unison transversely along the rear tool bar to thereby facilitate the adjustment of the units in desired crop row spacings.

16 Claims, 6 Drawing Figures

SUB-SOIL PLANTER

BACKGROUND OF THE INVENTION

1. Field of the Invention

The present invention relates to sub-soil planter machines, and, more particularly, is directed to an improved sub-soil planter machine wherein the components thereof are so arranged and mounted such that the depth of the machine has been lessened thereby reducing the force required to lift the machine and such that the components can be easily adjusted to thereby facilitate desired crop row spacings.

2. Description of the Prior Art

Sub-soil planters, oftentimes referred to as minimum tillage planters and no-till planters, are relatively new in the farming industry, however, their popularity has been continually increasing, in that, farmers are steadily recognizing that these machines not only reduce the amount of time required to prepare the soil and plant the seed crops, but also, that the use of these machines can increase their crop yield and enable them to practice better soil conservation in preventing soil erosion and reducing soil compaction.

In most farming areas, the loose top soil only extends to a depth of approximately 6 to 12 inches. Under this layer of top soil, normally lies a layer of approximately 2 to 4 inches of compacted soil, generally referred to as hardpan. Not only does this layer of hardpan impede soil drainage, but it also hampers root growth. Thus, in keeping with good farming practices, farmers now plow to a greater depth than before and use such tools as the sub-soiler shown and described in U.S. Pat. No. 3,042,118 to break up this hard under layer of compacted soil.

Due to the larger farms and in keeping with the tremendous technical advancements being made in the farming industry, farmers are using larger and larger equipment, in addition to, more sophisticated equipment which combines several typical farming steps into one operation. The use of these combined machines not only saves the farmer valuable time, but also reduces soil compaction since only one machine pass is required to perform several different operations wherein in the past, one machine pass was needed for each operation.

One type of such a combined machine is known as a sub-soil planter or no-till planter. This machine performs several operations into one pass of the machine; for example, these machines typically have long extending blades or teeth that break up and plow a furrow through the hardpan or subterranean layer of earth; some type of tilling mechanisms which further till the broken-up soil in preparing a finely divided soil seedbed; and seed planter units adapted to plant seeds in the prepared seedbed. Additionally, some of these machines have additional mechanisms attached thereto for performing still other operations; such as, the applying of fertilizers, herbicides, and insecticides to the soil.

An earlier version of such a sub-soil planter is disclosed in U.S. Pat. No. 2,734,439 granted to Padrich on Feb. 14, 1956. Shown is a two row mounted unit having a relatively rigid frame with the sub-soil blades, discs, planter units and fertilizer dispensing mechanism attached to the frame forming a more or less rigid structure. Although this machine was an advancement in the art during its time, it had various shortcomings. Over the years, several improvements have been made to these earlier machines, such as seen in U.S. Pat. No. 3,170,421 wherein there is disclosed a machine adapted to be mounted on the rear end of a tractor and having a plurality of sub-soil blades mounted on a transverse tool bar with a plurality of pulverizer tine units mounted on and in trailing relationship to the blades. Further, individual planter units are detachably attached to the tool bar and are disposed in a tag along fashion, a considerable distance rearwardly of the blades. The machine was so constructed such that, after planting, the planter units could be removed whereby the machine with its sub-soil blades and pulverizer tines would be used to perform other operations.

Another version of a sub-soil minimum tillage planter is seen in U.S. Pat. No. 3,175,522. This machine actually includes two separate distinct machines, a multi-row planter being drawn behind a tillage machine which is towed by a tractor.

Another prior art machine is seen in U.S. Pat. No. 4,055,126. The machine disclosed in this patent is similar in construction and appears to be an improvement to the machine disclosed in the above-mentioned U.S. Pat. No. 3,170,421; however, one of the differences being that this machine is adapted to be towed or drawn behind a tractor whereas the earlier version was of the mounted type.

A relatively recent prior art machine can be seen in the brochure, entitled "SUB-SOIL PLANTER" published by the Mellinger Manufacturing Company. This machine is of the type adapted to be mounted on the 3-point hitch of a tractor and includes a frame having two spaced apart transverse tool bars. Mounted on the front transverse tool bar is a plurality of sub-soil blades, whereas, the rear transverse tool bar supports a plurality of discs and a plurality of rotary spike-tooth members in trailing relationship to the discs. The discs and rotary members are attached to support members that are mounted on and extend rearwardly from the rear transverse tool bar. The rear tool bar also supports a pair of rearwardly extending hitch members for attachment, in trailing relationship, of a third tool bar that carries a plurality of independently driven planter units. Although this machine is an advancement in the art and performs quite satisfactorily, it has some disadvantages. One of the disadvantages being that the depth (length) of the machine is large relative to its width whereby the center of gravity of the machine is located at a distance from the rear end of the tractor, which the machine is mounted thereon, such that a very large tractor, due to this long moment arm, is required in overcoming this counterreacting moment to thereby lift the machine for transport purposes. Another disadvantage of this machine is that each planter unit requires its own drive mechanism and further that each of the various components of the machine are not free to float independently of another. Still another disadvantage is that it takes a considerable amount of time in adjusting the machine between various desired crop row spacings in that each component must be separately adjusted relative to another.

SUMMARY OF THE INVENTION

It is, accordingly, the principal object of the present invention to provide an improved sub-soil planter which obviates the shortcomings and various disadvantages associated with the aforementioned prior art machines. More particularly, it is an object of the present invention to provide a sub-soil planter such that, when mounted on a tractor, the center of gravity of the machine is relatively close to the rear end of the tractor. Another object of the present invention is to provide a sub-soil planter wherein the components thereof are easily adjusted so as to facilitate desired crop row spacings. Still another object of the present invention is to provide a sub-soil planter wherein the various components thereof can float independently of one another so as to follow the contour of the ground. Yet, another object of the present invention is to provide a sub-soil planter which is compact in structure yet easy to manufacture.

In pursuance of these and other objects, the present invention sets forth an improved sub-soil planter comprising a frame including front and rear transversely extending tool bars, a plurality of sub-soil blades adapted to break-up and plow a furrow in the subterranean hardpan, a plurality of rotary tilling units adapted to till the broken up soil in preparing a seedbed, and a plurality of planter units adapted to plant seed in a row in the prepared seedbed. The rear tool bar is pivotally connected to the front tool bar in trailing relationship therewith, the sub-soil blades are mounted on and spaced along the front tool bar and project forwardly therefrom, and the rotary tiller units and the planter units are mounted on the rear tool bar with the tiller units being disposed behind the sub-soil blades and extending forwardly from the rear tool bar and with the planter units being disposed in trailing relationship to the rotary tiller units and projecting rearwardly from the rear tool bar. Each of the aforementioned components of the sub-soil planter are positioned in close proximity to one another resulting in a sub-soil planter being compact in structure with its depth being relatively small in comparison to the total width of the machine. Furthermore, the various components are so mounted such that each component is free to float independently of another component whereby the sub-soil planter follows the contour of the soil as it moves forwardly across a field to be tilled and planted with row crops.

In the preferred embodiment of this invention, each of the rotary tiller units are moveably supported by a four-bar linkage such that each unit is free to float vertically, a predetermined distance, upwardly toward the space defined between the front and rear tool bars under conditions wherein an obstruction, such as a rock, is encountered in the field, thereby permitting the rotary unit to pass thereover as the machine moves forwardly. Preferably, respective ones of the planter units are connected to corresponding ones of the rotary tiller units such that each combined unit may be moved in unison transversely toward and away from one another to thereby facilitate the adjustment of the various components in achieving desired crop row spacings.

Furthermore, in the preferred embodiment, the improved sub-soil planter is provided with a mechanism for dispensing chemicals, such as fertilizer, on the soil and with a pair of ground engaging wheels. One of the ground engaging wheels is operably connected, through suitable drive components, to the chemical dispensing mechanism for driving same, whereas, the other one of the ground engaging wheels is operably connected, through suitable drive components, to the planter units such that all of the planter units are operably driven by the other one of the ground engaging wheels.

These and other advantages and attainments of the present invention will become apparent to those skilled in the art upon a reading of the following detailed description when taken in conjunction with the drawings in which there is shown and described an illustrative embodiment of the invention.

BRIEF DESCRIPTION OF THE DRAWINGS

In the course of the following detailed description, reference will be frequently made to the attached drawings in which.

DETAILED DESCRIPTION OF THE INVENTION

In the following description, right hand and left hand references are determined by standing at the rear of the machine facing in a direction of forward travel. Also, in the following description, it is to be understood that such terms as "forward", "rearward", "left", "upwardly", etc., are words of convenience and are not to be construed as limiting terms.

In General

Figure 1:
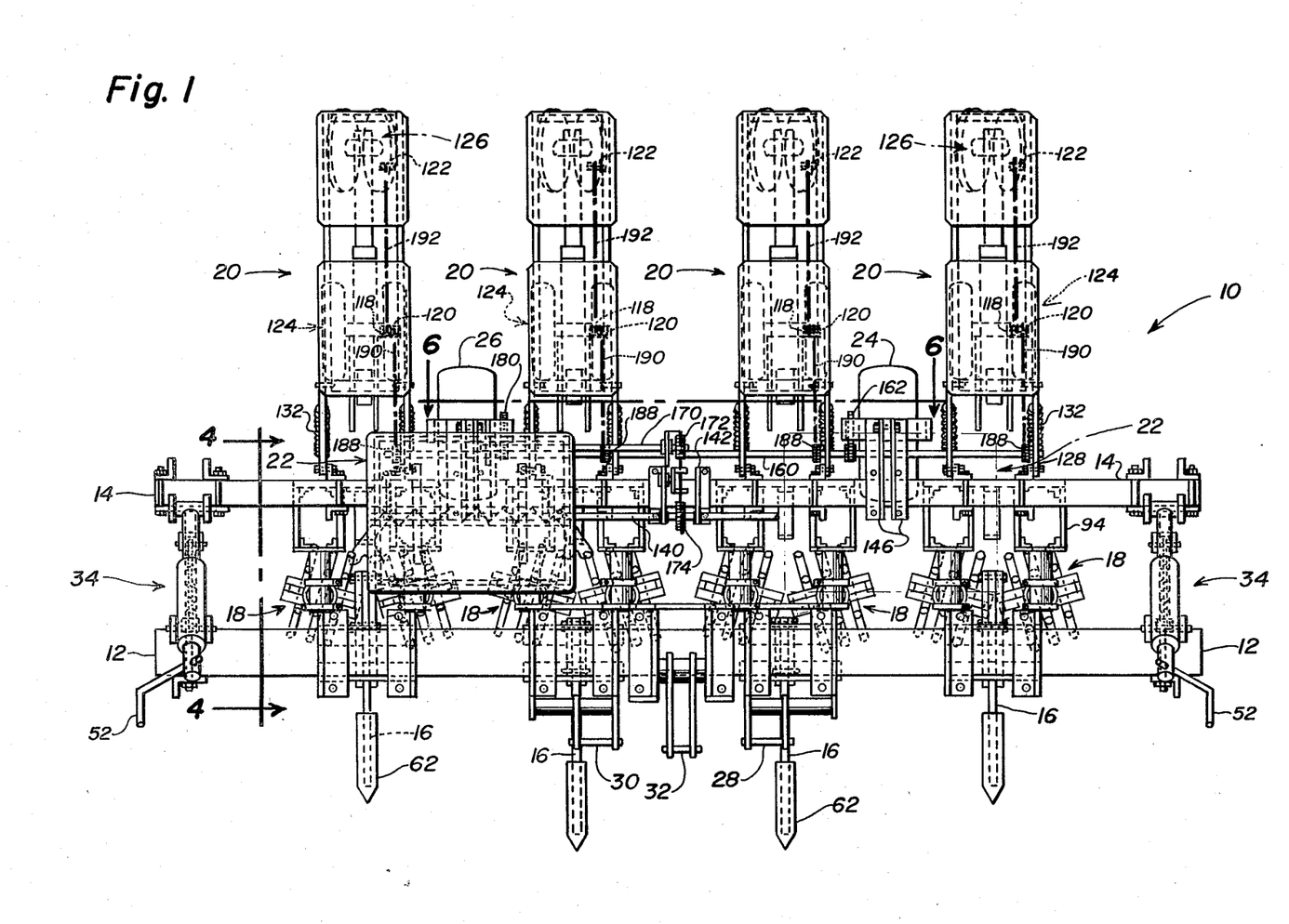
FIG. 1 is a top plan view of a sub-soil planter in accordance with the principles of the present invention, with the left fertilizer tank being shown in outline form so as to reveal more of the underlying mechanisms and with the planter units being diagramatically represented.

Referring now to the drawings, and particularly to FIG. 1, there is shown a sub-soil planter, being indicated generally by the numeral 10, incorporating the principles of the present invention. While the sub-soil planter 10 is shown, for illustrational purposes, as a four-row unit, the principles of the present invention can be carried out in any multi-row unit, such as, but not limited to, a 2, 3, 4, 5, 6, 7, 8, - - - etc. multi-row unit. Furthermore, even though the sub-soil planter 10 is depicted in the drawings as being of the mounted type, the principles of the present invention are equally applicable to a semi-mounted or pull-type model.

The sub-soil planter 10 basically comprises a frame, having front and rear transversely extending tool bars 12 and 14 respectively; a plurality of sub-soil blades 16 mounted on the front tool bar 12; a plurality of rotary tiller units 18 mounted on the rear tool bar 14, positioned rearwardly of the sub-soil blades 16; a plurality of planter units 20 mounted on the rear tool bar 14 in trailing relationships to the sub-soil blades 16 and rotary tiller units 18; a chemical dispensing mechanism 22, carried by the frame, for dispensing chemicals, such as, fertilizer on the soil; and a pair of ground engaging wheels with associated drive components for driving the planter units 20 and chemical dispensing mechanism 22, the left ground engaging wheel being indicated by the numeral 24 and the right ground engaging wheel being indicated by the numeral 26.

Mounted on and projecting forwardly from the front tool bar 12 of the frame are left and right lift arm brackets 28, 30 respectively and center yoke bracket 32 which makes up the conventional 3-point hitch arrangement for mounting the sub-soil planter 10 on the rear of a tractor (not shown) which propels the sub-soil planter forwardly across a field to be tilled and planted with row crops.

Carried on each end of the front transverse tool bar 12 is an adjustable length row marker (not shown) being of conventional structure and forming no part of the present invention. As is well known, the row markers serve to score a mark across the field a predetermined distance from one side or the other of the sub-soil planter so as to guide the operator in the return pass of the machine. Generally, these row markers are hydraulically moved from their lowered operative marking position to their raised inoperative rest position.

Frame Structure

Figure 3:
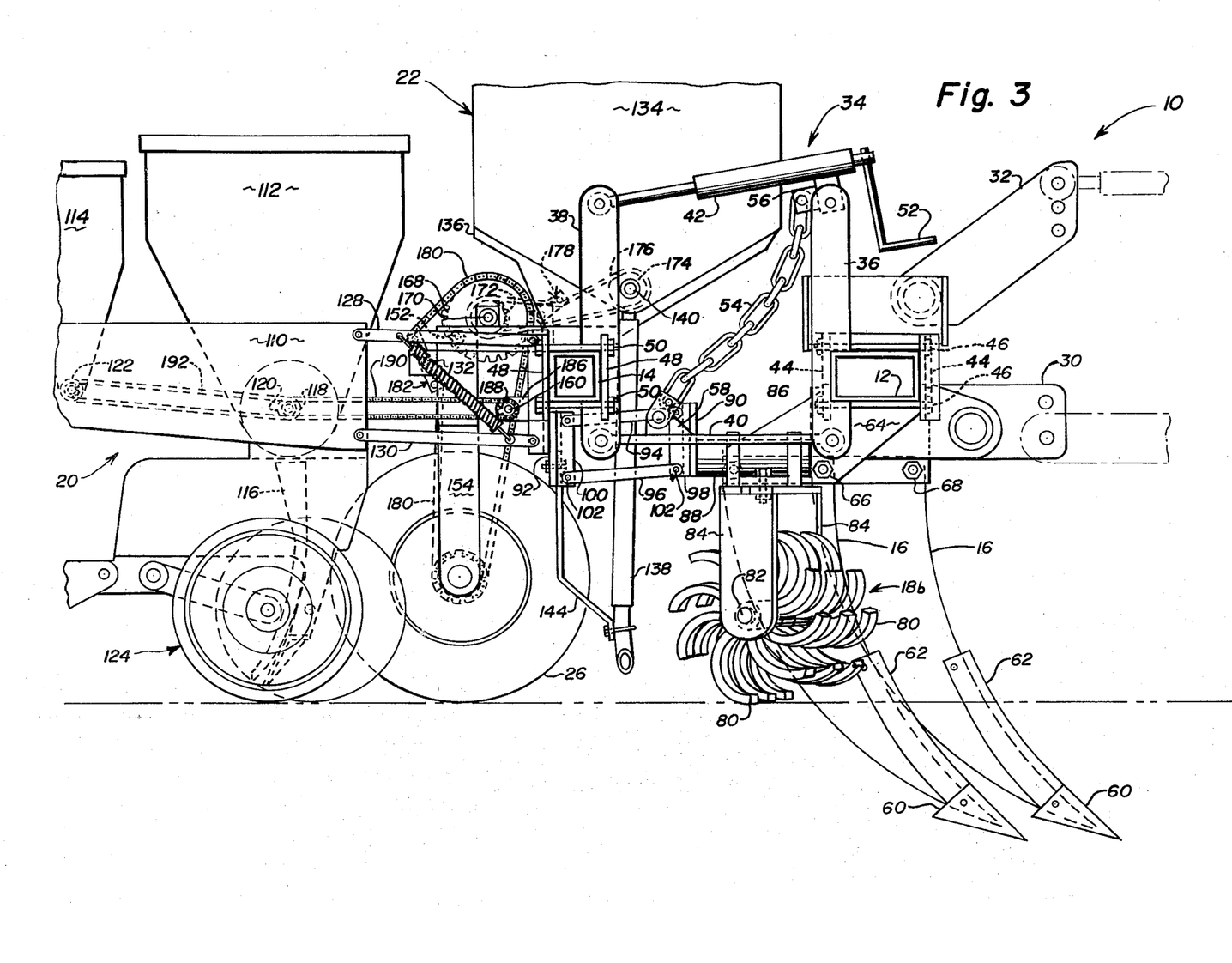
FIG. 3 is an enlarged fragmentary side elevational view of the sub-soil planter of FIGS. 1 and 2 showing the right ground engaging wheel which drives the fertilizer mechanism.

The front and rear transverse tool bars 12, 14 of the frame are connected to one another by a pair of parallel linkages 34 (one being located on the left-hand side and the other being located on the right-hand side of the machine) which thereby permit the rear tool bar 14 to float, vertically, a predetermined distance, relative to the front tool bar 12 as the sub-soil planter 10 moves forwardly across a field. The left-hand linkage is identical to the right-hand linkage, except for reverse orientation thereof, thus only the right-hand linkage will be discussed in detail. As best seen in FIG. 3, the right-hand parallel linkage 34 includes a front upright member 36, rear upright member 38, a cross member 40, and a screw adjustment crank 42. Preferably the front upright member 36 is attached to the rear face of the front tool bar 12 by a two part clamping bracket 44 and fastening bolts 46, whereas, the rear upright member 38 is attached to the front face of the rear tool bar 14 by a two part clamping bracket 48 and fastening bolts 50. Pivotally interconnecting the lower ends of the front and rear upright brackets 36, 38 is the cross member 40. Pivotally interconnecting the upper ends of the front and rear upright members 36, 38 is the screw adjustment crank 42 having one end of its male threaded rod pivotally connected to the upper end of the rear upright member 38 and with its female receiving end pivotally connected to the upper end of the front upright member 36. The screw adjustment crank 42 is provided with a handle 52 for screwing and unscrewing the male and female portions into and out of one another so as to adjust the distance between the upper ends of the front and rear upright members 36, 38. Adjustment, through crank 42, of the upper ends of the upright members 36, 38 toward and away from one another causes an angular deflection of the front tool bar 12, and accordingly, angular deflection of the sub-soil blades 16, thus permitting the blades to dig deeper or shallower as so desired.

For transport purposes, the frame structure, preferably, further includes a limit chain 54, disposed within each parallel linkage 34, having one end of the chain 54 connected to a tab 56, mounted on the upper end of the front upright member 36, and the other end of the chain 54 connected to a stub member 58, located on the cross member 40. Generally, in the operative mode of the sub-soil planter, as seen in FIG. 3, the chain 54 is slack; however, in the transport mode (not shown) the chain 54 is taut.

Sub-Soil Blades

The sub-soil blades 16 are mounted on the front transverse tool bar 12 and project forwardly therefrom along transversely spaced apart predetermined locations. In the preferred embodiment, as best seen in FIGS. 1 and 3, some of the sub-soil blades project further forwardly from the front tool bar 12 than other ones; however, this is only a matter of preference and does not constitute part of the present invention.

Figures 4, 5:
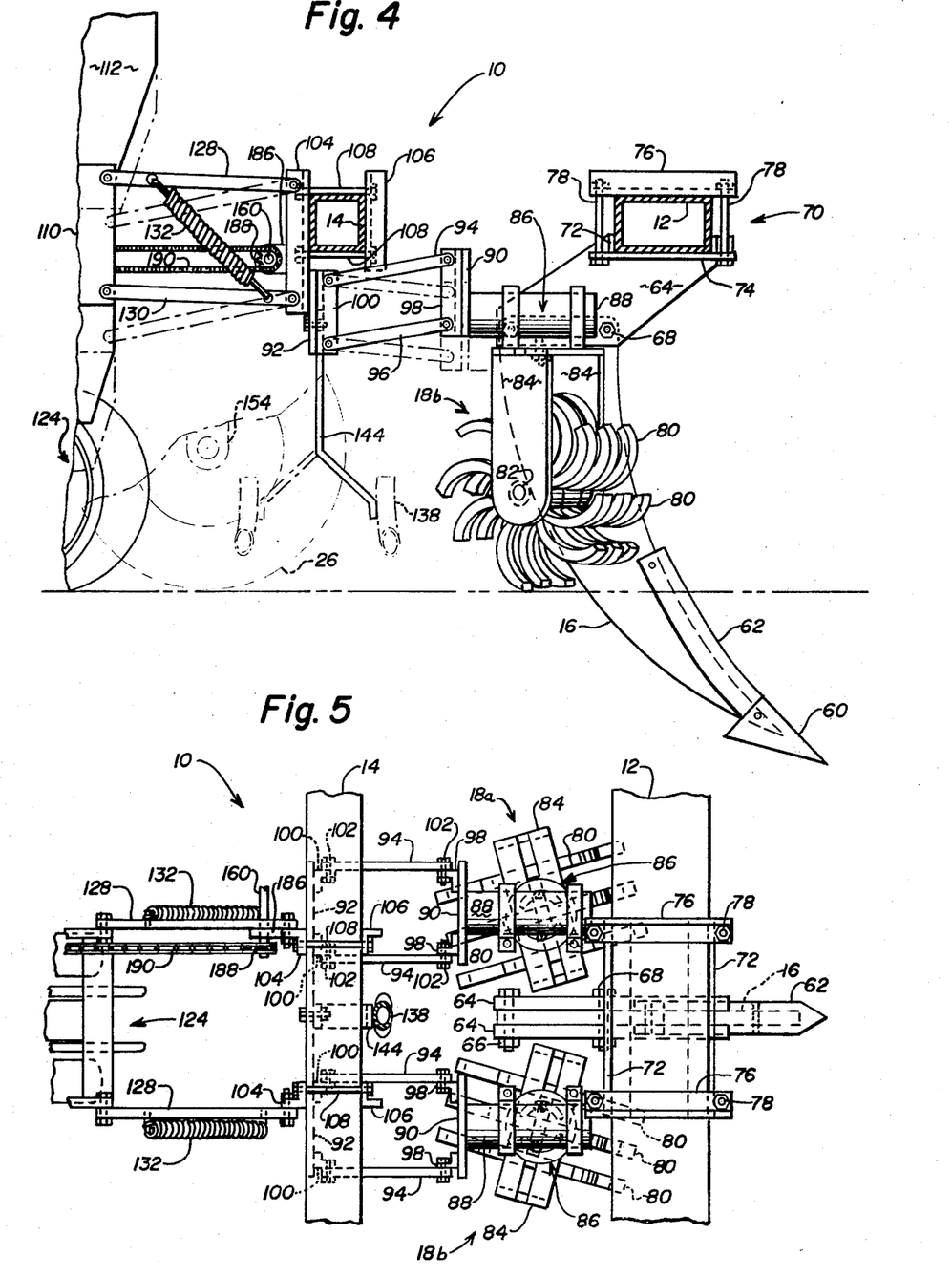
FIG. 4 is a sectional view of a portion of the sub-soil planter as taken along line 4—4 of FIG. 1 and being on a somewhat enlarged scale and showing the mounting arrangements of the various components of the sub-soil planter. The fertilizer discharge tube is shown in solid lines in one of its positions and in dashed lines in another one of its positions.
FIG. 5 is a top plan view of the portion of the sub-soil planter shown in FIG. 4.

As best seen in FIG. 4, each of the sub-soil blades 16, in the preferred embodiment, are constructed from a flat heavy stock and are shaped so as to curve downwardly and forwardly, tapering toward the lower end thereof. In that these blades are adapted to dig through the soil to the approximate depth of the hardpan or subterranean earth (approximately 14–18 inches), they are of a sturdy construction, in accordance with, well-known teachings. On the lower end of each blade 16 is mounted a replaceable shovel or shoe member 60 which is replaced from time to time depending upon wear. Additionally, mounted on the lower portion of each blade 16, upwards from the shoe 60, is a detachable wear plate 62.

The upper end of each of the sub-soil blades 16 extends between a pair of spaced apart plates 64 and is secured therewithin by a retaining bolt 66 and shear bolt 68, the purpose of the shear bolt being self-explanatory to those skilled in the art. The plates 64 are part of an adjustable bracket 70 for clamping the sub-soil blades 16 to the transversely extending front tool bar 12. The upper end of each pair of plates 64 are notched and have secured thereto, such as by welding or the like, a pair of, spaced apart, transversely extending angle-iron members 72 so disposed so as to conform to the shape of the bottom portion of the front tool bar 12, and thus, to mate therewith. Secured to and extending across the respective ends of the angle members 72 are lower flange members 74 which abut the under surface of tool bar 12. The clamping brackets 70 further include L-irons 76 having bolts 79 extending therethrough, and through the flange members 74, for clamping of the sub-soil blades 16 on the front tool bar (see FIGS. 3, 4 and 5).

Rotary Tilling Assemblies

For preparing a seedbed, the sub-soil planter 10 is provided with a plurality of rotary assemblies, each of which being adapted to work-up and till the soil so as to form a finely divided layer of soil suitable for the planting of seed therein. Each rotary tilling assembly includes a pair of rotary tilling or tiller units 18. In the preferred embodiment, as seen in FIG. 1, a pair of rotary tiller units 18 (one rotary tilling assembly) are associated with each of the sub-soil blades 16, and preferably, each pair is positioned behind respective ones of the sub-soil blades 16 and are so disposed to till the soil that has been plowed and torn-up by the blades. Furthermore, each one of each pair of rotary tiller units 18 are adjustably mounted such that each unit can be rotated about a vertical axis whereby the units may be canted or angularly disposed, relative to the forward direction of travel, in a series of predetermined angular locations. As seen in FIGS. 1 and 5, the left unit, which will now be referred to as 18a, and the right unit, which will now be referred to as 18b, of each pair of rotary tiller units 18 associated with each of the sub-soil blades 16, are so disposed such that the distance between the front portion of the teeth of the left and right units 18a, 18b respectively is greater than the distance between the rearmost portions of the teeth, whereby, in such angular disposition and upon forward advancement of the sub-soil planter 10, the left and right units 18a, 18b operate in unison so as to throw the tilled soil over the furrow created by the sub-soil blades 16. As readily appreciated, the rotary units 18a, 18b can be positioned relative to one another so to build a mound of loose tilled soil over the furrow, positioned so as to level the tilled soil over the furrow, or, in the other extreme, to throw the loose tilled soil away from the furrow in thereby creating a slight depression along the furrow. Generally, it is the customary practice, to position the units so as to build a slight mound of loose top soil over the furrow; however, such preference depends upon the operator or farmer. Still further, in accordance with the principles of the present invention, each pair of rotary tiller units 18a, 18b projects forwardly from the rear transverse tool bar 14, in close proximity to the rearmost portion of the respective sub-soil blades 16, and are so mounted such that each pair of rotary tiller units 18 are free to float vertically, a predetermined distance, independently of another pair of rotary tiller units and independently of each other, and further, independently of the floating action of the rear tool bar 14.

Now, in specific reference to FIGS. 3, 4 and 5, the rotary tiller units 18 and the unique mounting arrangement therefor will be further described. The unique mounting arrangement includes a plurality of flotation assemblies, one flotation assembly being associated with each rotary tilling assembly or each pair of rotary tiller units 18. Each flotation assembly includes a pair of flotation subassemblies, one subassembly being associated with each rotary tiller unit 18. Since each of the pairs of rotary tiller units 18a, 18b and the mounting thereof is identical, only one pair and its mounting will be described, the other pairs and their mounting being the same.

Each of the rotary tiller units 18a, 18b includes a cluster of spider or spoke-tooth wheels 80, each of which having a plurality of tines extending radially outwardly from a central hub. The spider wheels 80 are rotatably supported on an axle 82 supported between the free legs of a downwardly directed U-shaped bracket 84. The horizontal portion of the U-shaped bracket 84 is connected to a clamping-swivel mechanism, generally referred to by the numeral 86, for adjustably clamping the rotary tiller units 18 on a stub support pipe member 88. The mechanism 86 is a cast assembly provided with semi-cylindrical slots and associated fasteners whereby the tiller unit 18 is permitted to be rotated or swiveled about a vertical axis and releasably fastened in a desired canted position. Furthermore, the mechanism 86 permits the tiller unit 18 to be moved transversely a limited distance so as to adjust the transverse spacing between the associated left and right units 18a, 18b. A further description of the rotary tiller units 18a, 18b, and, in particular, the clamp-swivel mechanism 86 will not follow, in that, the specific construction thereof forms no part of this invention, and furthermore, in this preferred embodiment, the rotary tiller units 18a, 18b are of the type manufactured and sold by the Lilliston Corporation of Albany, Georgia. Thus, it should suffice to say that, in the sake of brevity, each of the rotary tiller units 18a and 18b are adjustably clamped to the stub pipe member 88.

As discussed earlier, each pair of rotary tiller units 18a, 18b projects forwardly from the rear tool bar 14 and is so mounted on the rear tool bar 14 by a flotation assembly so as to float vertically, a predetermined distance, independent of the floating action of the rear tool bar 14. The preferred flotation assembly for each pair of rotary tiller units 18a, 18b will now be discussed with particular reference to FIGS. 4 and 5. Preferably, each rotary tiller unit 18a, 18b is pivotally supported by a subassembly comprised of a parallel linkage which includes front plate 90, rear plate 92, and upper and lower pivot links 94 and 96 respectively. Secured, such as by welding or the like, to the rear face of the front plate 90 and to the front face of the rear plate 92 are respective pairs of vertically extending, spaced apart, L-irons 98 and 100. The respective upper and lower links 94, 96 pivotally interconnect, by suitable fasteners 102, the front L-irons 98 to the rear L-irons 100, and thus, pivotal interconnection of the front plate 90 to the rear plate 92. As seen in FIG. 4, the rear plate 92 is positioned below the rear tool bar 14 and extends transversely therealong a distance of about the length of the combined width of the left and right units 18a, 18b (see FIG. 5). For clamping purposes, a pair of spaced apart upright members 104 are secured to the rear face of the rear plate 92 and project upwardly therefrom, adjacent the rear face of the rear tool bar 14. A corresponding pair of upright members 106 are provided on the front face of the rear tool bar 14 whereby fastener elements 108, extending through members 104, 106 and passing over and underneath the rear tool bar 14, are provided for clamping the above described pair of parallel linkages to the rear transverse tool bar 14 (see FIGS. 4 and 5). As best seen in FIG. 5, the left stub pipe support member 88, associated with the left rotary unit 18a, is secured to the front face of the front plate 90, associated with the left parallel or four-bar linkage arrangement, whereas, the right stub pipe support member 88, associated with the right rotary unit 18b, is secured to the front face of the front plate 90, associated with the right parallel or four-bar linkage arrangement. Preferably, the pipe members 88 associated with each pair of rotary units 18a, 18b are slightly canted toward one another whereby the respective left and right units 18a, 18b can be adjustably moved therealong so as to further adjust the transverse spacing between the units.

Thus, it can be appreciated, from the above description of the flotation assemblies for mounting the rotary tiller units 18, that not only is each pair of rotary tiller units, associated with a respective one of the sub-soil blades 16, free to float vertically and independently with respect to the rear tool bar 14 and with respect to another pair of rotary tiller units associated with another one of the sub-soil blades, but, in addition thereto, each rotary tiller unit within each pair is permitted to float independently of the other one of the pair; i.e, the left unit 18a is free to float independently of the right unit 18b. The preferred described four-bar linkage associated with each of the left and right units 18a, 18b permits the respective units to move upwardly and downwardly, in a generally vertical path, a predetermined distance within a given minimum longitudinal space; thus, enabling the rotary tiller units 18 to be positioned in close proximity to the sub-soil blades 16, thereby adding to the reduction in the total depth of the sub-soil planter 10 which will become more fully apparent later on in this specification. Further, the four-bar parallel supporting linkages allow the respective rotary tiller units to move upwardly toward and into the space defined between the front and rear tool bars 12, 14 should any one of the units encounter an obstruction, such as a rock, in the field as the machine 10 advances forwardly thereover. Still further, the rear plate 92, and associated clamping bracket therewith, being common to each linkage pair (18a, 18b) not only facilitates the transverse adjustment of the rotary tiller units 18 along the rear tool bar 18 whereby each pair is moved in unison, but, also has further advantages which will be set forth more clearly in the description of the planter units 20 which follows.

Planter Units

As seen in FIG. 1, the sub-soil planter 10 is provided with a plurality of individual planter units 20, (being diagramatically represented) each being adapted to plant a row of seed crop in the seedbed prepared by the rotary tiller units 18. More particularly, one planter unit 20 is associated with each pair of rotary tiller units 18a, 18b and with each sub-soil blade 16. Each of the planter units 20 are transversely spaced from one another, in accordance with desired row spacings, and are mounted on the rear tool bar, in trailing relationship thereto, along predetermined transverse locations. The construction and operation of the planter units 20 "per se" are not novel to the present invention and form no part thereof, and therefore, any conventional planter unit will suffice; however, in the preferred embodiment, the planter units shown therein are of the type referred to as the "Maxi-Merge" planter which is manufactured and sold by John Deere. Accordingly, only a brief description of the planter units 20 will be given.

Briefly, in reference to FIGS. 3 and 4 wherein only the front portion of a planter unit is shown, the planter unit 20 basically includes a subframe structure, generally indicated by the numeral 110, having a seed box 112 carried on the front portion thereof and an insecticide or herbicide box 114 carried on the rear portion thereof. Disposed within the lower portion of the seed box 112 is a mechanically driven seed dispenser (not shown) operable to dispense seed through the downspout 116, and disposed within the lower portion of the herbicide box 114 is a mechanically driven dispensing mechanism (not shown) operable to dispense herbicide through a downspout (not shown). Being conventional, it should suffice to say that the seed dispensing mechanism has associated therewith a pair of side-by-side (inner and outer) drive sprockets 118, 120 disposed on one side of the frame housing, whereas, the herbicide dispensing mechanism has associated therewith a drive sprocket 122; the drives and related components will be further referred to later on in this specification.

Extending from the lower portion of the planter frame 110 and disposed generally under the seed box 112 in a depth gauging and trenching assembly, generally referred to by the numeral 124, which comprises a set of gauge wheels having associated therewith a pair of generally concentric discs and which is adapted to form a V-shaped trench in the prepared seed bed wherein seed is deposited thereinto through the downspout 116. Located below the herbicide box 114 and mounted on the lower portion of the frame 112 is a pair of covering wheels 126 which are adapted to cover and compact the loose soil over the seed-containing V-shaped trench. A further and more detailed description of the structure and operation of the planter unit can be gained from a reading of the operator's manual on the above-mentioned John Deere Maxi-Merge planter.

In accordance with the principles of the present invention, the planter units 20 are mounted so that each individual unit is free to float vertically relative to another unit and independently of and along with the floating action of the rear tool bar 14 as the sub-soil planter 10 is moved forwardly across a field. Accordingly, in the preferred embodiment, each of the planter units 20 are pivotally supported on the rear tool bar 14, in trailing relationship thereto, by a four-bar parallel linkage which is best seen in FIGS. 3, 4 and 5 and which includes the upright members 104, the front portion of the planter frame 112, upper links 128 and lower links 130. As seen in FIG. 4, the respective upper and lower links 128, 130 are pivotally interconnected to the respective upright members 104 and planter frame 112 by suitable fasteners. The planter supporting four-bar linkage further includes a pair of coil springs 132 to thereby assist in the raising of the planter units 20 as the sub-soil planter 10 is raised on the 3-point hitch of the tractor during the transport mode, in addition to, providing a constant tension on the planter units during their operative mode. As seen in FIGS. 4 and 5, one spring 132 extends on each side of the four-bar linkage, stretching between the upper and lower links 128, 130 and suitably retained therewithin by aperture provided in the respective links.

As appreciated, from the preferred embodiment, the parallel linkages supporting the left and right rotary tiller units 18a, 18b and the parallel linkage supporting a respective planter unit 20 are each mounted to a common bracket assembly which is clamped on the rear tool bar 14, thus forming individual row units which are moveable toward and away from one another to thereby obtain desired row spacings. It can be thus seen that the coupling of the pair of rotary tiller units 18a, 18b with the planter unit 20 allows the same to be moved in unison, thereby facilitating the row adjustment procedure, and thus resulting in savings of valuable time to the farmer.

Chemical Dispenser

Figure 2:
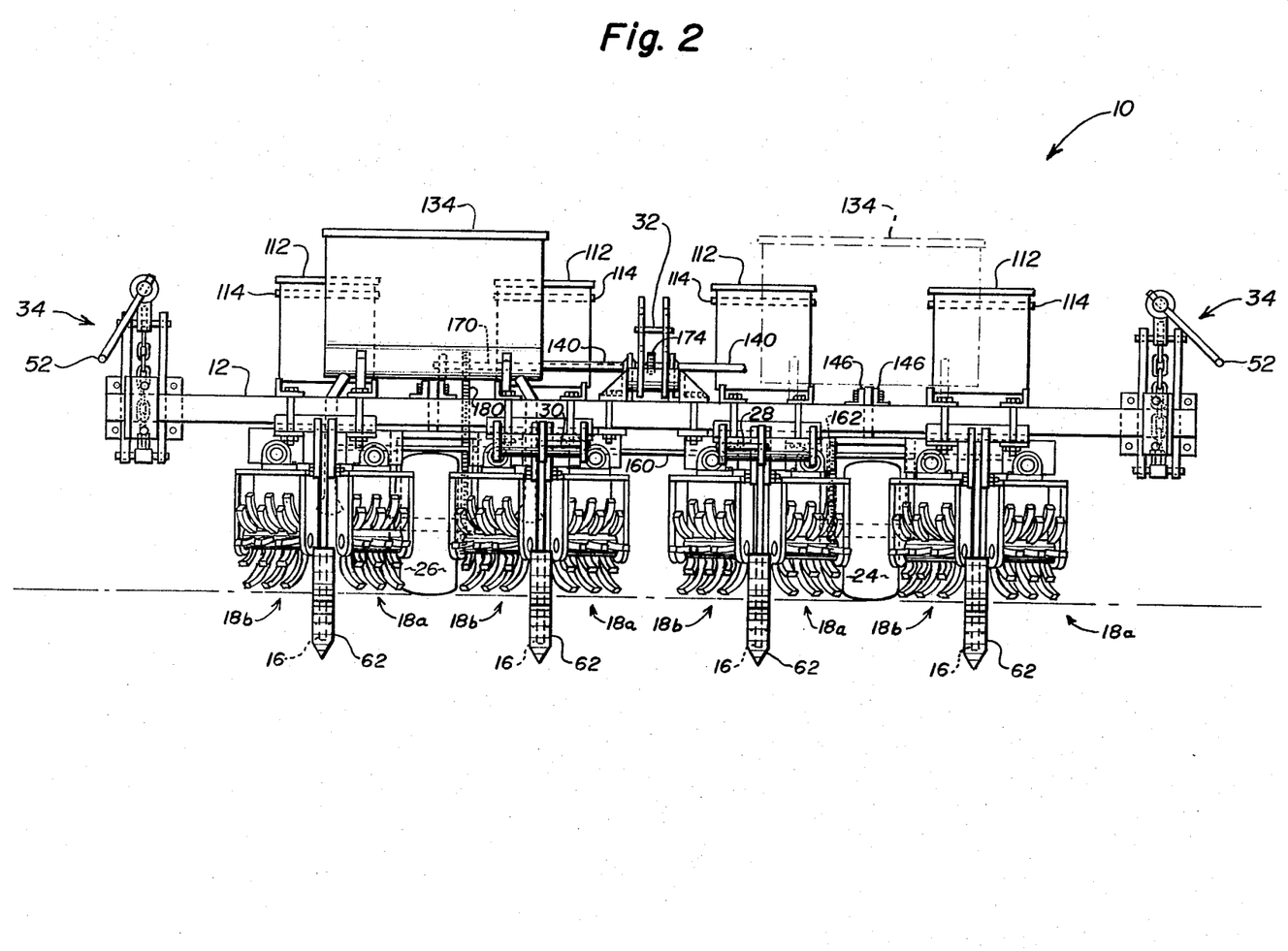
FIG. 2 is a front elevational view of the sub-soil planter of FIG. 1 again with the left fertilizer tank being shown in dashed lines.

The sub-soil planter 10 is further provided with a chemical dispenser for dispensing chemicals, such as fertilizer or the like, onto the soil as the planter 10 is moved forwardly across a field. The fertilizer dispenser, being conventional, includes a pair of fertilizer hoppers 134, (one being disposed on the left side and the other one being disposed on the right side of the machine) which are carried on and positioned slightly above the front tool bar 12 by suitable brackets 136 (best seen in FIGS. 2 and 6). Disposed within the lower portion of each of the left and right hoppers 134 is a conventional metering mechanism, not shown, for metering fertilizer through flexible downspouts 138 which are connected to various openings located on the underside of the hoppers 134. The fertilizer metering mechanisms are operably driven by rotation of shaft 140 which is interconnected therebetween and supported by suitable bearing mounts 142 (see FIG. 6). The distal end of each of the flexible downspouts 138 is held in one of several predetermined positions by a detachably connected bracket 144 (see FIGS. 3 and 4) whereby the fertilizer can be applied to various locations on the soil; such as but not limited to, the area directly in front of or directly behind the sub-soil blades 16, the area in front of or behind or along side of the rotary tiller units 18, and on the area in the vicinity of the planter units 20. As seen in FIG. 4, the downspout 138 is shown in solid lines in one of its predetermined locations and in dashed lines in another one of its predetermined locations. The bracket 144 can be of any desired shape; however, for illustrational purposes, the bracket as seen in FIG. 3 is of an obtuse configuration having its one end detachably connected to member 100 by a suitable fastener.

Drive Components

Figure 6:
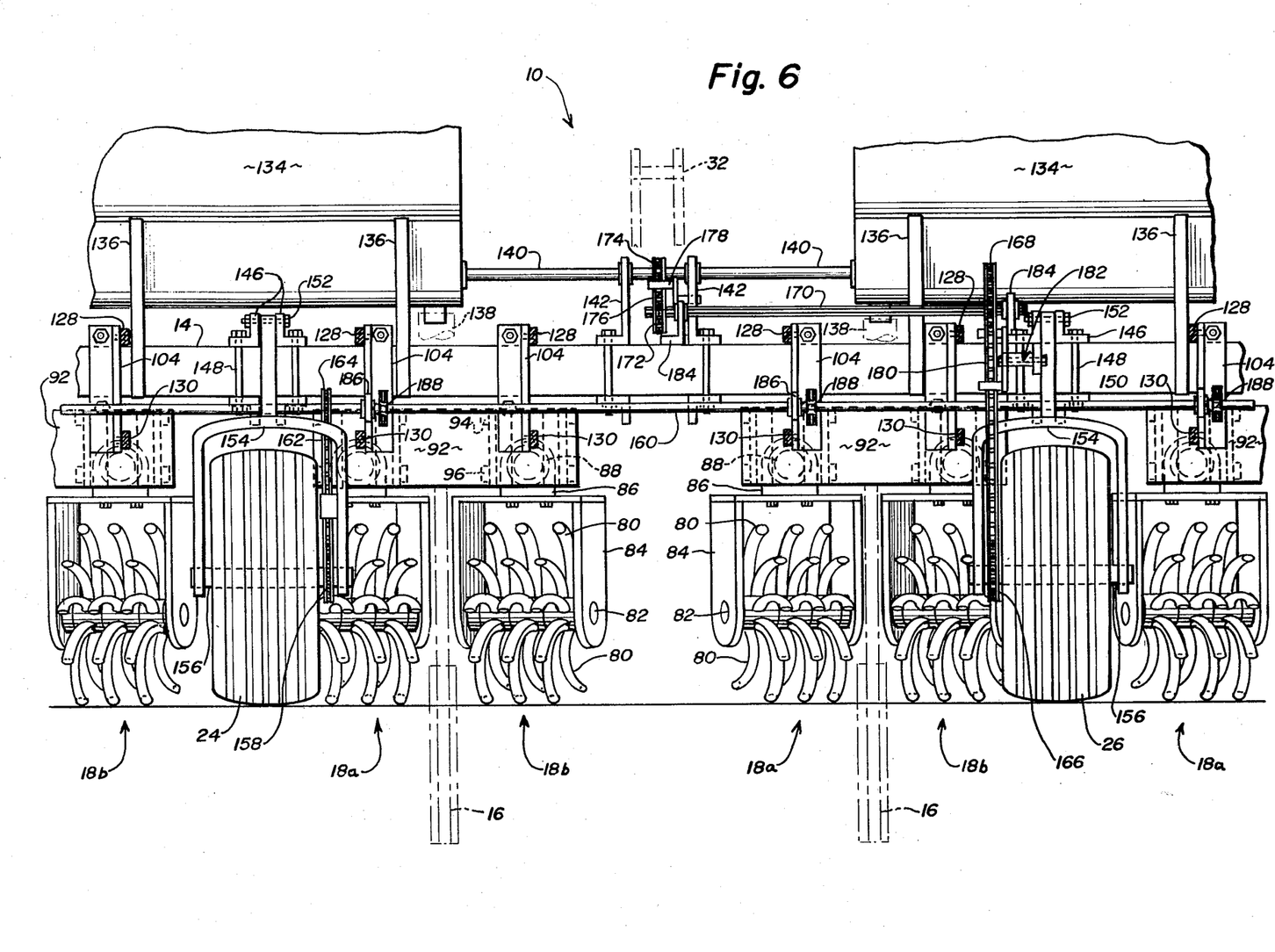
FIG. 6 is an enlarged fragmentary rear view of the sub-soil planter taken on the line 6—6 of FIG. 1 and showing the drive operably associated with the fertilizer hoppers and the planter units.

The various components associated with the sub-soil planter 10 for driving the seed and herbicide dispensing mechanisms of each of the planter units 20 and for driving the metering mechanisms of the fertilizer dispenser 22 will now be discussed in detail. In the preferred embodiment (FIG. 1), the sub-soil planter 10 is provided with left and right ground engaging wheels 24, 26 respectively, one wheel being adapted to drive the mechanisms associated with the planter units 20 and the other wheel being adapted to drive the mechanisms associated with the fertilizer dispenser 22. As best seen in FIGS. 3 and 6, each of the wheels 24, 26 is adjustably mounted on, for transverse movement along, the rear tool bar 14 by bracket assembly that includes a pair of space apart angle members 146 that extend across the top surface of the rear tool bar 14 and project outwardly therebeyond a short distance. The angle members 146 are fastened to the tool bar 14 by fastener elements 148 which extend through a plate 150, located on the underside of the rear tool bar 14, upwardly along the sides of the tool bar and through the members 146. Clamped, by elements 152, between the free ends of the rearwardly extending members 146 is the upper end of a downwardly directed tuning-fork shaped wheel support member 154. The wheels 24, 26 are rotatably supported between the bifurcated ends of support members 154 by axles 156. The mounting of the wheels 24, 26 is such that although they are rigidly attached to the rear tool bar 14 so as to vertically move therewith as the tool bar is raised and lowered, the wheels can be easily moved transversely along the tool bar by unfastening and refastening of the brackets.

As best seen in FIG. 6, mounted on the right side of the left wheel axle 156 is a drive sprocket 158 for driving the planter drive shaft 160 through a chain 162 entrained around drive sprocket 158 and driven sprocket 164 which is suitably fixed on the shaft 160 by set screws or the like. Mounted on the left side of the right wheel axle 156 is a drive sprocket 166 for driving driven sprocket 168, located on one end of a horizontally extending jackshaft 170, which, in turn, drives sprocket 172, located on the opposite end of the jackshaft 170, and, which in turn, drives the sprocket 174 located on shaft 140 which is operably connected to the fertilizer metering mechanism of hoppers 134. Sprocket 172 is driveably connected to sprocket 174 by chain 176 which has a conventional tensioning device 178 associated therewith for maintaining proper tension on the chain. Sprocket 168 is driveably connected to sprocket 166 by chain 180 which also has a conventional tensioning device 182 associated therewith for maintaining proper tension. The jackshaft 170 is positioned rearwardly and slightly above the rear tool bar 14, extends transversely from the approximate middle of the machine to the mid-section of the right hopper 134, and is supported within suitable bearings 184 (see FIGS. 1, 3 and 6).

The planter drive shaft 160 is positioned forwardly of the planter units 20, extending transversely along the rear side of the rear tool bar 14 and is supported within suitable bearings carried by retainers 186 (see FIGS. 1 and 6). The retainers 186 are secured to the rear side of upright members 104 which are part of the bracket assembly for clamping the rotary tiller units 18 and planter units 20 on the rear tool bar 14, thus, as the units 18, 20 are moved in unison to obtain desired row spacings, the retainers 186 are moved therewith.

Supported on the planter drive shaft 160, along predetermined locations, is a plurality of sprockets 188, one being associated with each of the planter units 20. The sprockets 188 are mounted on shaft 160 by means, such as set screws or the like, whereby they can be adjustably positioned along the shaft as so desired. Respective ones of sprockets 188 are driveably connected to corresponding inner seed dispensing sprockets 118 on the respective planter units 20 by drive chains 190. Chains 192 driveably connect the outer sprockets 120 to the herbicide dispensing sprockets 122. Thus, as the left wheel 24 rotates over the ground, drive sprocket 158 rotates therewith, which causes the driven sprockets 164 to rotate through chain 162, which in turn, causes rotation of the drive shaft 160. Each of the sprockets 188 rotate, upon rotation of drive shaft 160, causing inner sprockets 118 to rotate through chains 190, thereby operably driving the seed dispensing mechanism associated within each of the planter units 20. Further, in that, the outer sprocket 120 is mounted on this same shaft as the inner sprocket 118, then as one rotates the other one also rotates, thus, the herbicide dispensing mechanism is operably driven through the rotations of sprockets 120, chains 192 and sprockets 122.

As can be appreciated, the drive for the sub-soil planter 10 is such that each of the planter units 20 are operable driven by the left ground engaging wheel 24, whereas, the chemical dispenser 22 is operably driven by the right ground engaging wheel 26. It will be further noted that the drive is so arranged and mounted so as to facilitate the movement of the various components thereof as required in the row-spacing adjustment.

From the foregoing, it can be seen that the sub-soil planter 10 of the present invention is unique in its construction, as well as, in the arrangement of its components, thereby overcoming and reducing many of the problems experienced in the prior art machines. With the various components so arranged and mounted in close proximity to one another, the sub-soil planter 10 has a reduced depth, whereby, when mounted on the rear end of a tractor, the center of gravity of the sub-soil planter is positioned only a short distance from the tractor, thus enabling a given sized tractor to lift a larger machine. Further, due to this unique arrangement and mounting, the various components (such as, the rotary tiller units 18 and planter units 20) are to free to float independently of one another over the contour of the soil. Still further, the mounting or coupling of each of the planter units 20 to a respective pair of rotary tiller units 18 facilitates the crop row spacing adjustment operation thereby saving the farmer valuable time. And, still further, the drive is simple in structure and operation resulting in cost savings over the prior art machines that require separate ground drive wheels for each planter unit, as well as, a complicated drive arrangement for operating the fertilizer dispenser.

It is thought that the invention and many of its attendant advantages will be understood from the foregoing description and it will be apparent that various changes may be made in form, construction and arrangement of the components of the sub-soil planter without departing from the spirit and scope of the invention or sacrificing all of its material advantages, the form herein before described being merely a preferred or exemplary embodiment thereof.

What is claimed is:

1. An improved agricultural machine for planting of row crops which combines at least three normal operations into one step; namely, sub-soiling the soil, tilling the soil that has been sub-soiled in preparing a seedbed, and planting seed in the prepared seedbed whereby soil compaction is reduced due to the combining of operations of three separate machines into one machine such that only one machine pass is required in performing the three operations and thus further resulting in savings of time and labor costs in a farming operation, said improved agricultural machine comprising:
   (a) a front transverse tool bar adapted to be connected to a farm tractor for towing said machine across a field to be planted;
   (b) a plurality of transversely spaced apart sub-soil blades mounted on said front tool bar and adapted to plow furrows in the subterranean soil as said machine is propelled forwardly over a field;
   (c) a rear transverse tool bar spaced rearwardly of said front tool bar;
   (d) first means for mounting said rear tool bar on said front tool bar such that said rear tool bar is free to float a predetermined distance upwardly and downwardly relative to said front tool bar during operation of said machine;
   (e) a plurality of rotary tilling assemblies, corresponding to the number of sub-soil blades, disposed rearwardly the sub-soil blades for tilling the soil plowed by said sub-soil blades in thereby preparing a seedbed;
   (f) a plurality of transversely spaced apart seed planter units, corresponding to the number of rotary tilling assemblies, disposed rearwardly of and in trailing relationship to said rotary tilling assemblies for
   planting seed in said seedbed; and
   (g) second means for mounting corresponding said rotary tilling assemblies and planter units of said rear tool bar such that a corresponding rotary tilling assembly and planter unit can moved in unison transversely along said rear tool bar so to facilitate transverse spacing of said planter units and said rotary tilling assemblies in desired predetermined crop row spacings.

2. The improved agricultural machine as described in claim 1, further comprising;
   chemical dispensing means carried by said machine for dispensing chemicals, such as fertilizer or the like, onto the soil to be planted, said chemical dispensing means including at least one tank supported on one of said front and rear tool bars for temporary storage of chemicals, metering means associated with said at least one storage tank for metering a predetermined amount of chemicals onto the soil during operation of said machine, and transfer conduits for transferring said chemicals from said metering means to said soil; and
   drive means for operably driving said chemical dispensing means and said planter units,
   said drive means including a pair of transversely spaced apart ground engaging wheels carried by said rear tool bar, first drive components operably interconnected between one of said ground engaging wheels and said planter units, and second drive components operably interconnected between the other one of said ground engaging wheels and said chemical dispensing means such that as said machine moves across a field said plurality of seed planter units are operably driven by said one ground engaging wheel through said first drive components to plant seed in said seedbed while said chemical dispensing means is operably driven by said other one of said ground engaging wheels through said second drive components to dispense chemicals onto said soil.

3. The improved agricultural machine as described in claim 1, wherein said second mounting means includes for each corresponding rotary tilling assembly and planter unit, a bracket clamped to said rear tool bar with a first linkage fastened to said bracket and projecting forwardly therefrom for supporting said rotary tilling assembly and with a second linkage connected to said bracket and projecting rearwardly therefrom for supporting said planter unit whereby corresponding ones of said rotary tilling assemblies and said planter units can be moved toward and away from one another for proper crop row spacing by transverse movement of said clamped brackets along said rear tool bar.

4. The improved agricultural machine as described in claim 3, wherein said first and second linkages of said second mounting means are respectively pivotally fastened and pivotally connected to said bracket whereby said rotary tilling assemblies and said planter units are free to float vertically over and along the soil independently of one another and independently of the vertical flotation of said rear tool bar during operation of said machine.

5. The improved agricultural machine as described in claim 4, wherein at least one of said first and second linkages includes a four-bar linkage.

6. An improved sub-soiling, tilling, and planting machine comprising:
   (a) a plurality of sub-soil blades adapted to furrow deep into the soil to subterranean soil level;
   (b) a plurality of rotary tilling units adapted to rotate over through the soil to till the soil to thereby provide a seedbed for planting of seed therein as said machine moves forwardly across a field;
   (c) a plurality of seed planter units adapted to plant seed in said seedbed; and
   (d) a frame structure for carrying said sub-soil blades, said rotary tilling units, and said planter units, and adapted to be mounted on the rear end of a tractor for towing said machine across a field to be prepared and planted with row crops,
   said frame structure including a pair of transversely extending, longitudinally spaced apart, tool bars, said sub-soil blades being attached to the front one of said tool bars along transverse predetermined locations, said rotary tilling units and said planter units being attached to the rear one of said tool bars in trailing relationship to said sub-soil blades, each of said rotary tilling units and said planter units being pivotally mounted on said rear tool bar so as to permit each of the respective units to freely float upwardly and downwardly over the soil independently of one another as said machine moves forwardly across a field whereby said respective rotary tilling unit and planter units follow the contour of the soil within their respective positions, said frame structure further including a plurality of clamp mechanisms a plurality of support members, a plurality of fastener mechanisms and a plurality of connector mechanisms, each of said clamp mechanisms clamping one end of each of said support members to said rear tool bar such that said support member projects downwardly a predetermined distance toward said soil and from said rear tool bar, each of said fastener mechanisms fastening one of said rotary tilling units to the lower end of one of said support members such that said rotary tilling units are disposed forwardly of said support members, each of said connector mechanisms connecting one of said seed planter units to the lower end of one of said support members such that said seed planter units are disposed in trailing relationship to respective one of said rotary tilling units.

7. The improved machine as described in claim 6, wherein a respective one of said planter units and a respective one of said rotary tilling units are connected to one another to form a combined unit, said combined units being releasably attached to said rear tool bar along transverse predetermined locations whereby said combined units may be easily moved from one location to another to achieve desired row spacings.

8. The improved machine as described in claim 6, wherein sub-soil blades, said rotary tilling units, and said planter units are arranged so on said frame structure in close proximity to one another such that the distance from the front to the rear of said machine is small relative to the width of said machine whereby a tractor of a given size to which said machine is mounted thereon may be capable of easily lifting said machine since the moment force encountered during the lifting of said machine is reduced due to shorter moment arm distance which is provided by the compactness and close proximity of the various components, said sub-soil blades being attached to said front tool bar and projecting downwardly and forwardly therefrom toward the rear portion of a tractor to which said machine is to be mounted on, said rotary tilling units being disposed directly behind said sub-soil blades and said planter units being disposed directly behind said rotary tilling units.

9. An improved sub-soil planter machine comprising:
(a) a front transverse tool bar;
(b) a rear transverse tool bar disposed behind and pivotally connected to said front tool bar for independent flotation relative thereto during operation of said machine;
(c) a plurality of sub-soil blades spaced along said front tool bar and adapted to plow furrows in the subterranean soil as said machine is moved forwardly across a field;
(d) rotary tilling means adapted to till the soil to thereby prepare a seedbed for planting of seed therein, said rotary tilling means including a plurality of rotary tilling assemblies with each rotary tilling assembly being formed by a pair of rotary tilling units,
(e) a plurality of flotation assemblies corresponding to the number of rotary tilling assemblies for connecting respective rotary tilling assemblies to said rear tool bar, each flotation assembly including a bracket clamped to said rear tool bar and a pair of transversely spaced fore-and-aft extending subassemblies for pivotally supporting a corresponding rotary tilling assembly forwardly of said rear tool bar and in close proximity to a respective one of said sub-soil blades, one end of each subassembly being connected to said bracket whereas a rotary tilling unit is mounted on the other end of each subassembly such that a pair of rotary tilling units are positioned rearwardly and to the lateral sides of each sub-soil blade so as to cooperate with one another in preparing the seedbed, said subassemblies permitting each of said rotary tilling units of respective rotary tilling assemblies to freely float independently of one another and independent of the floating action of said rear tool bar;
(f) seed planter means disposed behind said rotary tilling means and adapted to plant seed in said seedbed; and
(g) means for mounting said seed planter means on said rear tool bar for independent flotation relative thereto.

10. The improved machine as described in claim 9, wherein each of said subassemblies includes a four-bar linkage.

11. An improved sub-soil planter machine comprising:
(a) a front transverse tool bar;
(b) a rear transverse tool bar disposed behind and pivotally connected to said front tool bar for independent flotation relative thereto during operation of said machine;
(c) a plurality of sub-soil blades spaced along said front tool bar and adapted to plow furrows in the subterranean soil as said machine is moved forwardly across a field;
(d) a rotary tilling means adapted to till the soil to thereby prepare a seedbed for planting of seed therein;
(e) a plurality of flotation assemblies interconnecting said rotary tilling means to said rear tool bar, each flotation assembly including a bracket being clamped to said rear tool bar and including a linkage pivotally interconnecting said bracket to said rotary tilling means and projecting forwardly from said rear tool bar to position said rotary tilling means in closer proximity to said front tool bar than said rear tool bar and providing independent flotation of said rotary tilling means relative to said flotation action of said rear tool bar as said machine moves across a field, thereby permitting said rotary tilling means to float generally vertically relative to said soil such that upon encountering on obstruction in the field, such as a rock, said rotary tilling means moves upwardly and between said front and rear tool bars so as to pass over said obstruction during operation of said machine as it moves forwardly across a field;
(f) seed planter means disposed behind said rotary tilling means and adapted to plant seed in said seedbed;
(g) means for mounting said seed planter means on said rear tool bar for independent flotation relative thereto;

(h) said rotary tilling means including a plurality of rotary tilling assemblies corresponding to the number of flotation assemblies, one rotary tilling assembly being connected to one flotation assembly;

(i) said planter means including a plurality of seed planter units corresponding to the number of rotary tilling assemblies, one planter unit being connected to one bracket in trailing relationship to a rotary tilling assembly; and (j) one bracket being common to a respective planter unit and a respective rotary tilling assembly thereby forming a plurality of combined crop row units that can be moved transversely toward and away from one another along said rear tool bar to thereby facilitate the arrangement of said planter units and said rotary tilling assemblies in predetermined row spacings.

12. An improved sub-soil planter machine comprising;

(a) a front transverse tool bar;

(b) a rear transverse tool bar disposed behind and pivotally connected to said front tool bar for independent flotation relative thereto during operation of said machine;

(c) a plurality of sub-soil blades spaced along said front tool bar and adapted to plow furrows in the subterranean soil as said machine is moved forwardly across a field;

(d) rotary tilling means adapted to till the soil to thereby prepare a seedbed for planting of seed therein;

(e) a plurality of flotation assemblies interconnecting said rotary tilling means to said rear tool bar, each flotation assembly being clamped to and projecting forwardly from said rear tool bar to position said rotary tilling means in closer proximity to said front tool bar than said rear tool bar and to provide independent flotation of said rotary tilling means relative to said flotation action of said rear tool bar as said machine moves across a field;

(f) said rotary tilling means including a plurality of rotary tilling assemblies, each rotary tilling assembly being formed by a pair of rotary tilling units, one rotary tilling assembly being associated with one flotation assembly;

(g) said flotation assembly including a pair of transversely spaced, fore and aft extending, subassemblies pivotally supporting said rotary tilling assembly, one rotary tilling unit being supported on each subassembly;

(h) said subassemblies permitting each of the rotary tilling units of respective rotary tilling assemblies to freely float independently of one another and independent of the floating action of said rear tool bar;

(i) each subassembly including a short stub-member mounted to and projecting forwardly from a forward end of said subassembly, each stub-member supporting a rotary tilling unit such that a pair of rotary tilling units are associated with each sub-soil blade whereby said pair of rotary tilling units cooperate with one another in preparing the seedbed;

(j) seed planter means disposed behind said rotary tilling means and adapted to plant seed in said seedbed; and (k) means for mounting said seed planter means on said rear tool bar for independent flotation relative thereto.

13. The improved machine as described in claim 12, wherein said subassembly further includes clamping means for adjustably clamping said rotary tilling units on respective stub-members such that each rotary tilling unit can be moved in a fore-and-aft direction along its respective stub-member and such that a respective pair of rotary tilling units can be adjusted toward and away from one another in tansverse spacings.

14. The improved machine as described in claim 12, wherein each rotary tilling unit is adjustably mounted on its respective subassembly such that a respective pair of said rotary tilling units can be angularly positioned with respect to the forward travel direction of said machine so as to cooperate with one another in scattering the tilled soil across the furrows in various desired patterns.

15. An improved minimum tillage machine including a frame having two spaced apart transversely extending tool bars and a hitch for attaching the machine on the three-point hitch of a tractor for advancing the machine over a field, a plurality of sub-soil blades for plowing furrows through the ground to the approximate depth of the subterranean soil, a plurality of rotary tilling units for tilling the soil that has been sub-soiled in thereby providing a seedbed, a plurality of planter units for planting seeds in rows in the prepared seedbed, and chemical dispensing means carried by said frame and operable to dispense chemicals, such as fertilizer or the like, onto the soil, the improvement providing in combination therewith:

(a) means for adjustably mounting said sub-soil blades on the front one of said transverse tool bars such that said sub-soil blades can be positioned in selected transversely spaced apart predetermined locations along said front tool bar, each of said sub-soil blades projecting downwardly and forwardly from said front tool bar;

means for pivotally mounting the rear one of said tool bars in a trailing relationship to said front tool bar such that said rear tool bar is permitted to float vertically a predetermined height relative to said front tool bar as said machine advances over a field;

(c) means for pivotally mounting each of said rotary tilling units on and projecting forwardly from said rear tool bar such that each of said rotary tilling units are free to float vertically along with and independently of the flotation of said rear tool bar;

(d) means for pivotally mounting each of said planter units on said rear tool bar in trailing relationship to said rotary tilling units such that each planter unit is free to float vertically along with and independently of the floating action of said rear tool bar and said rotary tilling units and;

(e) drive means for operably driving said chemical dispensing means and said planter units, said drive means including a pair of transversely spaced ground engaging wheels carried by said frame, first drive components operably interconnected between one of said ground engaging wheels and said planter units, and second drive components operably interconnected between the other one of said ground engaging wheels and said chemical dispensing means such that upon forward movement of said machine across a field said plurality of seed planter units are operably driven by said one ground engaging wheel through said first drive components to plant seed in said seedbed while said chemical dispensing means is operably driven by said other one of said ground engaging wheels through said second drive components to dispense chemicals onto said soil.

16. The improved machine as described in claim 15, further comprising means for connecting one planter unit to at least one rotary tilling unit such that each of said respective connected units can be moved in unison transversely along said rear tool bar thereby facilitating the adjustment of the connected units relative to one another in obtaining desired crop row spacing.

* * * * *

UNITED STATES PATENT OFFICE
CERTIFICATE OF CORRECTION

PATENT NO. : 4,241,674
DATED : December 30, 1980
INVENTOR(S) : Paul B. Mellinger It is certified that error appears in the above-identified patent and that said Letters Patent are hereby corrected as shown below:

Column 6, line 47, delete "79" and insert --78--.

Column 9, line 61, delete "in " and insert --is--.

Column 10, line 31, delete "aperture" and insert --apertures--.

Column 12, line 60, after are, delete "to".

Claim 1, line 41, after "wardly" insert --of--;
line 50, delete "said";
line 51, delete "of" and insert --on--.

Claim 6, line 49, after "to" insert --the--.

Claim 6,(Col.15) line 6, delete "unit" and insert --units--;
line 9, after "mechanisms" insert --,-- ;
line 24, delete "one" and insert --ones--.

Claim 8, line 35, after "wherein" insert --said--;
line 36, delete --so--.

Signed and Sealed this

Twenty-third Day of June 1981

[SEAL]

Attest:

RENE D. TEGTMEYER

Attesting Officer     Acting Commissioner of Patents and Trademarks